United States Patent [19]
Hamada

[11] Patent Number: 4,652,959
[45] Date of Patent: Mar. 24, 1987

[54] APPARATUS FOR OPTIMIZING CONTACT BETWEEN A ROTATING FLEXIBLE MAGNETIC SHEET AND A MAGNETIC HEAD

[75] Inventor: Taizo Hamada, Moriguchi, Japan

[73] Assignee: Matsushita Electric Industrial Co., Ltd., Osaka, Japan

[21] Appl. No.: 723,296

[22] Filed: Apr. 15, 1985

[30] Foreign Application Priority Data

Apr. 17, 1984 [JP] Japan .................. 59-76939

[51] Int. Cl.$^4$ .................. G11B 15/60; G11B 5/54; G11B 5/55; G11B 21/22
[52] U.S. Cl. .................. 360/130.3; 360/105; 360/106; 360/130.34
[58] Field of Search .......... 360/130.1, 130.2, 130.3, 360/130.34, 128, 97, 99, 86, 133, 135

[56] References Cited

U.S. PATENT DOCUMENTS

| | | | |
|---|---|---|---|
| 4,074,330 | 2/1978 | Norton et al. | 360/86 |
| 4,214,286 | 7/1980 | Ragle et al. | 360/130.2 |
| 4,414,592 | 11/1983 | Losee et al. | 360/99 |
| 4,466,032 | 8/1984 | Saito | 360/130.34 |
| 4,511,944 | 4/1985 | Saito | 360/133 |

FOREIGN PATENT DOCUMENTS

| | | | |
|---|---|---|---|
| 55-157161 | 12/1980 | Japan | 360/99 |
| 57-113466 | 7/1982 | Japan | 360/99 |
| 59-33666 | 2/1984 | Japan | 360/130.34 |

OTHER PUBLICATIONS

IBM Technical Disclosure Bulletin, vol. 24, No. 11B, Apr. 1982, pp. 6169–6170 "Contoured Linear Pressure Pad . . . Disks", by Knappe et al.
IBM Tech. Disc. Bull., vol. 19, No. 6, Nov. 1976, p. 1962 "Soundhead Backup Pad", by Breyfogle et al.
IBM Tech. Disc. Bull., vol. 6, No. 9, Feb. 1964, pp. 57–58, "Pressure Pad for Magnetic Heads", by Bond.

Primary Examiner—John H. Wolff
Assistant Examiner—Alfonso Garcia
Attorney, Agent, or Firm—Stevens, Davis, Miller & Mosher

[57] ABSTRACT

A recording and reproducing apparatus having a magnetic head and a pad facing the magnetic head such as to form therebetween a passage for a flexible rotary magnetic sheet. The pad is provided with a protrusion which protrudes toward the magnetic sheet along the edge of the pad adjacent the radially outer end of the magnetic sheet. The pad is further provided with at least one inclined surface facing the magnetic sheet and inclined with respect to the plane of rotation of the rotary magnetic sheet, in the direction perpendicular to the line connecting the center of the magnetic head and the center of rotation of the magnetic sheet. The inclined surface is provided at the downstream portion of the pad as viewed in the direction of flow of air accompanying the rotating magnetic sheet.

6 Claims, 15 Drawing Figures

APPARATUS FOR OPTIMIZING CONTACT BETWEEN A ROTATING FLEXIBLE MAGNETIC SHEET AND A MAGNETIC HEAD

BACKGROUND OF THE INVENTION

The present invention relates to an apparatus in which picture signals or various kinds of digital signals are recorded and reproduced in and from a rotating flexible magnetic sheet through a magnetic head which is held in contact with the rotating magnetic sheet.

In the rotary magnetic sheet apparatus of the kind described, it is quite important to maintain a good contact between the magnetic sheet and the magnetic head, in order to attain a highly stable and reliable recording and reproduction of picture signals and various kinds of digital signals.

In order to meet this requirement, hitherto, an apparatus has been proposed in which, as shown in FIG. 1, a pad 5 is disposed facing a magnetic sheet 4 so that a rotating magnetic sheet 3 runs through a gap formed between the magnetic head 4 and the pad 5, thereby attaining a stable contact between the magnetic head 4 and the magnetic sheet 3. The pad 5 is provided with, for example, a head receiving recess 5a and the surface of the pad 5 facing the magnetic head 4 is covered by a buffer member 6. As shown in FIG. 3, the magnetic head projects into the recess 5a by a distance of a suitable amount to cause a slight deflection of the magnetic sheet 3 interposed therebetween, so that the magnetic sheet 3 makes contact with the magnetic head 4 with a moderate contact pressure due to its resilient force.

This prior arrangement, however, unavoidably suffers from the following disadvantages.

When the magnetic head 4 is held in contact with an outer peripheral portion of the magnetic sheet 3 for recording or reproduction, the contact cannot be maintained stably due to insufficient contact pressure because the outer peripheral portion of the magnetic sheet 3 is spaced from the sheet support 2a on a hub 2 to have a greater flexure as compared with the inner peripheral portion thereof.

Furthermore, it is to be noted also that, when the magnetic head 4 is positioned on the side of an outer peripheral portion of the magnetic sheet 3 as shown in FIG. 4, the pressing force of the outer peripheral portion of the magnetic sheet 3 exerted on the magnetic head 4 is reduced, so that the magnetic sheet 3 is contacted only by a portion of the surface of the magnetic head 4, as will be seen from FIG. 5.

In addition, the prior apparatus has the following disadvantage. The condition of contact between the magnetic sheet 3 and the magentic head 4 is influenced greatly by the shape of the pad 5 and by the gap between the magnetic head 4 and the pad 5. Accordingly, in order to establish a good condition of contact between the magnetic sheet 3 and magnetic head 4, it is essential to maintain a high accuracy with respect to the shape of the pad 5 and the gap between the magnetic head 4 and the pad 5.

However, the buffer member 6 is susceptible to a change in its dimension under the influence of changes in temperature and humidity and abrasion produced by the contact thereof with the magnetic sheet 3. According, the dimension of the pad 5 and the gap between the magnetic head 4 and the pad 5 are liable to change. In consequence, the condition of contact between the magnetic sheet 3 and the magnetic head 4 are also liable to change, so that such apparatus has a low reliability.

SUMMARY OF THE INVENTION

It is an object of the invention to provide a recording and reproducing apparatus using a rotary magnetic sheet, which apparatus is capable of maintain a good contact between the magnetic sheet and the magnetic head over a wide range extending from the outer peripheral portion to the inner peripheral portion of the magnetic sheet, thus ensuring a high reliability in the recording and reproduction, thereby overcoming the above-described problems of the prior art.

To this end, the present invention provides a recording and reproducing apparatus using a flexible rotary magnetic sheet and having a magnetic head and a pad facing the magnetic head to permit a flexible magnetic sheet to pass through a gap between the pad and the magnetic head, therby causing the magnetic sheet to contact with the magnetic head for recording and reproduction of signals, the improvement comprising a protrusion which is provided on the pad near the outer peripheral edge of the magnetic sheet to extend toward the magnetic sheet, said protrusion contributing to balancing contact pressure force which are exerted on the magnetic head by the outer and inner peripheral portions of the magnetic sheet.

With the arrangement of the apparatus, the magnetic sheet always follows the surface of the magnetic head to attain a good contact therewith even when the magnetic head is positioned at the inner and outer peripheral portions of the magnetic sheet.

The above and other objects, features and advantages will become clear from the following description of the preferred embodiments.

DESCRIPTION OF THE PREFERRED EMBODIMENTS

Preferred embodiments of the invention will be described hereinunder with reference to the accompanying drawings.

Figure 1:
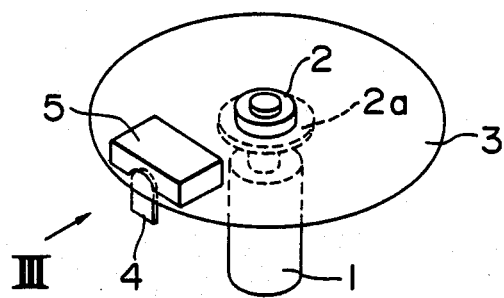
FIG. 1 is a schematic perspective view of a prior recording and reproducing apparatus using a rotary magnetic sheet.
Figure 2:
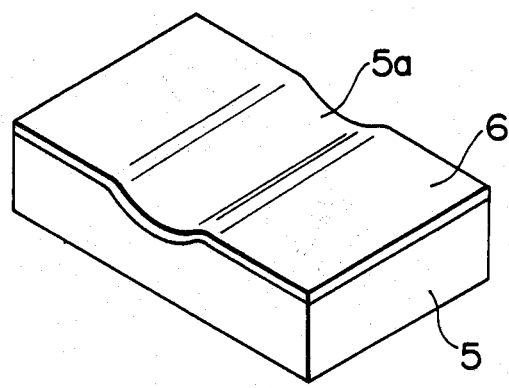
FIG. 2 is a perspective view of a pad incorporated in the prior apparatus shown in FIG. 1.
Figure 3:
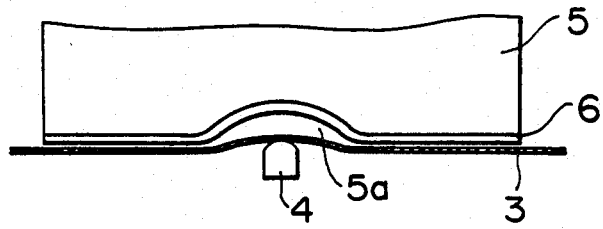
FIG. 3 is an enlarged view of a portion of the concentional apparatus as viewed in the direction of an arrow III in FIG. 1.
Figure 4:
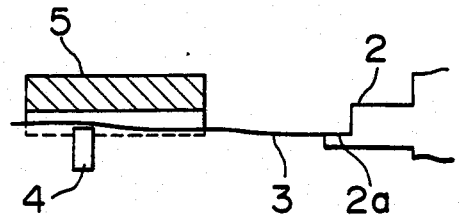
FIGS. 4 and 5 are views illustrating the state of contact between a magnetic sheet and a magnetic head in the prior apparatus.
Figure 5:
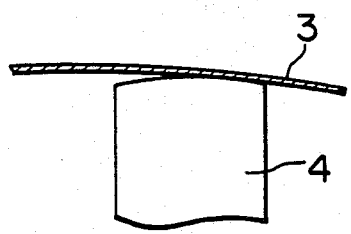
Figure 6:
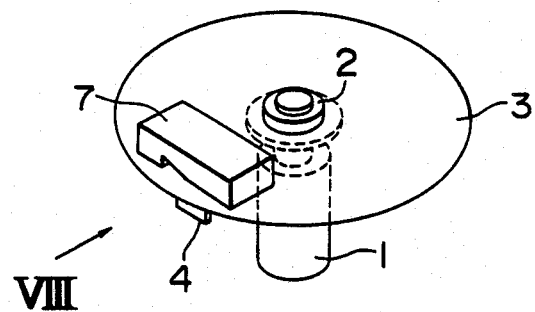
FIG. 6 is a perspective view of a recording and reproducing apparatus using a rotary magnetic disc, constructed in accordance with an embodiment of the invention.

Referring first to FIG. 6 schematically showing a recording and reproducing apparatus according to an embodiment of the invention, a magnetic head 4 and the pad 7 are disposed facing each other, and a flexible magnetic sheet 3 is placed between the magnetic head 4 and the pad 7.

Figure 7:
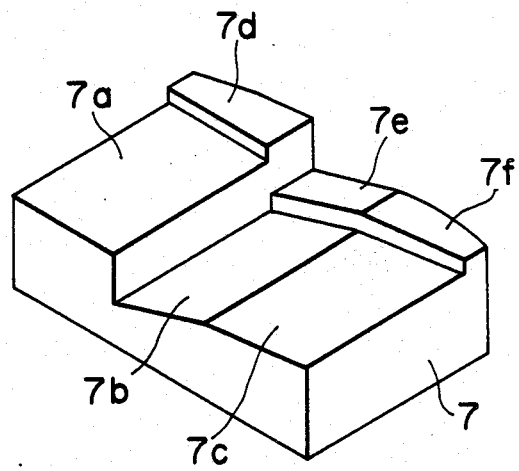
FIG. 7 is a perspective view of a pad incorporated in the apparatus of the invention shown in FIG. 6.
Figure 8:
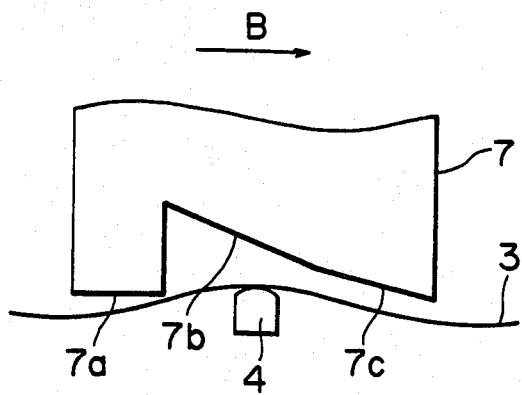
FIG. 8 is an enlarged view of the pad as viewed in the direction of an arrow VIII in FIG. 6.
Figure 9:
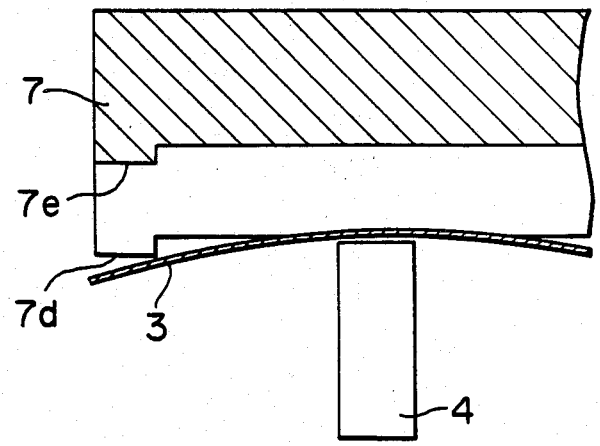
FIG. 9 is a view illustrating the state of contact between the magnetic sheet and the magnetic head in the embodiment of the invention.

FIG. 7 shows a pad 7 incorporated in a recording and reproducing apparatus according to an embodiment of the invention. The pad 7 has a surface 7a parallel to the plane of rotation of the magnetic sheet 3, surfaces 7b, 7c inclined relative to the plane of rotation, and surfaces 7d, 7e, 7f parallel to the surfaces 7a, 7b, 7c, respectively and disposed adjacent to the outer periphery of the magnetic sheet 3 to extend over a predetermined distance toward the magnetic sheet 3. As shown in FIG. 8, the magnetic head 4 protrudes by a suitable distance toward the pad 7. When the magnetic sheet 3 rotates in the direction shown by an arrow B, an air flow adhering to the magnetic sheet 3 flows into a wedge-shaped air gap defined between the magnetic sheet 3 and the surfaces 7a to 7c of the pad 7, so that a positive pressure is produced in the air gap. Consequently, the magnetic sheet 3 is urged toward the magnetic head 4 without contacting with the pad 7. At this time, the magnetic sheet 3 assumes a shape, as shown in FIG. 8, near the magnetic head 4 to favorably contact therewith. In addition, even when the magnetic head 4 is positioned near the outer periphery of the magnetic sheet 3, the protruding portions 7d, 7e, 7f of the pad 7 serve to balance the pressing force of the outer peripheral portion of the magnetic sheet 3 on the magnetic head 4 with the pressing force of the inner peripheral portion of the magnetic sheet 3 on the magnetic head 4, thereby providing a good contact between the magnetic sheet 3 and the magnetic head 4. More specifically, the magnetic sheet 3 always follows the surface profile of the magnetic head 4 to favorably contact therewith whether the magnetic head 4 is positioned near the inner periphery or outer periphery of the magnetic sheet.

Figure 10:
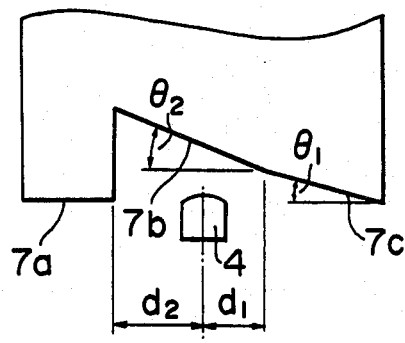
FIGS. 10 and 11 are views illustrating dimensional relationships between the magnetic head and the pad.
Figure 11:
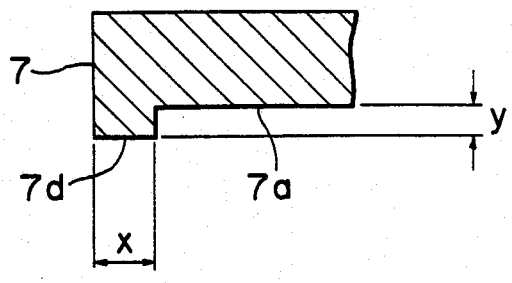

Experiments showed that a favorable effect is obtained when the dimensions of respective portions of the pad 7 shown in FIGS. 10 and 11 are selected to fall within the ranges shown below, when the magnetic sheet diameter, thickness and rotation speed were 47 mm, 40 μm and 3600 rpm.

$\theta_1 = 2°$ to $3°$ $\theta_2 = \theta_1 + \alpha (\alpha = 2°$ to $10°)$ $d_1 = 2.5$ to $5$ (mm)

$d_2 = 2.5$ to $7$ (mm)

$x = 0.5$ to $1.5$ (mm)

$y = 30$ to $80$ (μm)

It was confirmed also that the good result was obtained when the extent to which the magnetic head 4 was extended in the cavity on the pad 7 ranged between 60 and 100 μm as measured from the surface 7a of the pad 7.

Figure 12A:
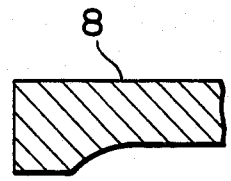
FIGS. 12A to 12D are views illustrating the pads in different embodiments of the apparatus of the invention.
Figure 12B:
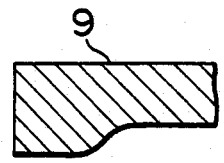
Figure 12C:
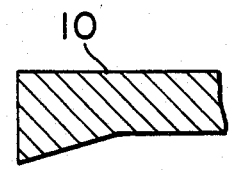
Figure 12D:
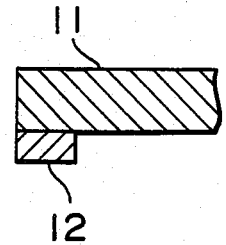

In the embodiment described above, the protrusions provided on the pad 7 in combination constitute a stepwise configuration. Such configurations shown at 8 to 10 in FIGS. 12A to 12C serve effectively. Also, a protrusion 12 formed of a different material from a pad 11 serves effectively.

As described above with respect to the embodiments, the present invention provides a recording and reproducing apparatus using a flexible rotary magnetic sheet and comprising a magnetic head and a pad facing the magnetic head to permit the magnetic sheet to travel between the magnetic head and the pad and contact with the magnetic head for recording and reproducing signals, the pad including a protrusion disposed near the outer periphery of the magnetic sheet and extended toward the magnetic sheet to attain a good contact between the magnetic head and magnetic sheet even when the magnetic head is positioned about the outer periphery of the magnetic sheet. Consequently, recording and reproduction can be positively performed over a wide range extended from the inner periphery to the outer periphery of a magnetic sheet. Moreover, the pressing force exerted on the magnetic head by the magnetic sheet always balances between the outer periphery and the inner periphery of the magnetic sheet to eliminate unsymmetrical wear of the magnetic head and lengthen the service life thereof.

It is to be noted also that, in the apparatus of the invention, the pad does not contact with the magnetic sheet when the sheet is rotating at a predetermined speed. This eliminates the necessity for the use of special buffer or wear-resistant material as the material of the pad so as to allow a wide selection of the pad material. As the pad material, metallic materials such as alluminum alloy and precision forming resins such as polycarbonate resin are preferably used because such materials exhibit a high dimensional stability and a high working precision and ensure a stable contact between the magnetic sheet and the magnetic head for a long period of time, thus contributing to a further improvement in the reliability of the apparatus of the invention. The high working precision of these materials simplifies or completely eliminates the pad position adjustment during the assembly of the apparatus, thus affording a high mass-production.

What is claimed is:

1. An apparatus for recording on and reproducing from a rotatable magnetic disk comprising a movable magnetic head and a stationary pad arranged relative to said magnetic head such that a magnetic disk secured at its center to a hub is interposed between said pad and said magnetic head, said pad comprising a body having a first projection disposed upstream of said head in a direction of rotation of said disk and extending radially of and protruding toward said magnetic disk, a second projection disposed downstream of said magnetic head in the direction of said rotation and extended radially of said magnetic disk and protruding toward said magnetic disk, and a third projection disposed only near the outer periphery of said magnetic disk and extending circumferentially of said magnetic disk and protruding farther toward said magnetic disk than said first and second projections, said third projection serving to restrain a relieved portion of said magnetic disk near its outer periphery which is produced by being pushed by said magnetic head, said first, second and third projections forming at least a portion of a side of said pad facing said magnetic disk, said head being disposed between said first and second projections in a circumferential direction of said disk and between said third projection and said hub in a radial direction of said disk.

2. An apparatus as set forth in claim 1, wherein the second projection of said pad has a surface which faces said magnetic disk and inclines toward said disk in a direction of rotation of said disk.

3. An apparatus as set forth in claim 2, wherein the first projection of said pad has a surface which faces said magnetic disk and is substantially parallel to said magnetic disk.

4. An apparatus as set forth in claim 2, wherein said pad is formed of a metallic material.

5. An apparatus as set forth in claim 2, wherein said pad is formed of a molded resin.

6. An apparatus as set forth in claim 2, wherein said pad has a surface which is disposed between said first and second projections to face said magnetic disk and inclines toward said disk in a direction of rotation of said disk, said surface disposed between said first and second projections having a higher elevation relative to the surface of said disk than said inclined surface of said second projection.

* * * * *